United States Patent
Ranzau

(10) Patent No.: US 9,669,692 B2
(45) Date of Patent: Jun. 6, 2017

(54) CORNER STRUCTURE OF A HOLLOW CHAMBER SEAL

(71) Applicant: Arnold Jäger Holding GmbH, Hannover (DE)

(72) Inventor: Heiko Ranzau, Walsrode (DE)

(73) Assignee: Jäger Automobil-Technik GmbH, Osterode am Harz (DE)

( * ) Notice: Subject to any disclaimer, the term of this patent is extended or adjusted under 35 U.S.C. 154(b) by 0 days.

(21) Appl. No.: 14/815,545

(22) Filed: Jul. 31, 2015

(65) Prior Publication Data

US 2016/0176275 A1    Jun. 23, 2016

(30) Foreign Application Priority Data

Aug. 6, 2014    (DE) .......................... 10 2014 111 215

(51) Int. Cl.
| | |
|---|---|
| *B60J 10/21* | (2016.01) |
| *B60J 10/82* | (2016.01) |
| *B60J 10/24* | (2016.01) |
| *B60J 10/30* | (2016.01) |
| *B60J 10/90* | (2016.01) |

(52) U.S. Cl.
CPC .............. *B60J 10/21* (2016.02); *B60J 10/24* (2016.02); *B60J 10/30* (2016.02); *B60J 10/82* (2016.02); *B60J 10/90* (2016.02)

(58) Field of Classification Search
CPC .......... E06B 7/2305; B60J 10/90; B60J 10/21
USPC ....................................................... 49/479.1
See application file for complete search history.

(56) References Cited

U.S. PATENT DOCUMENTS

| | | | | | |
|---|---|---|---|---|---|
| 2,503,882 | A | * | 4/1950 | Medford | ............... B29C 33/448 156/155 |
| 4,840,001 | A | * | 6/1989 | Kimisawa | ................ B60J 10/70 296/93 |
| 5,069,849 | A | * | 12/1991 | Wain | ................. B29C 45/14467 264/138 |
| 5,088,787 | A | * | 2/1992 | Gross | .................... B60J 10/235 296/201 |

(Continued)

FOREIGN PATENT DOCUMENTS

| | | |
|---|---|---|
| DE | 299 23 157 U1 | 3/2000 |
| DE | 100 46 975 A1 | 5/2002 |
| DE | 10 2004 020 799 A1 | 11/2005 |

*Primary Examiner* — Katherine Mitchell
*Assistant Examiner* — Marcus Menezes
(74) *Attorney, Agent, or Firm* — Shlesinger, Arkwright & Garvey LLP

(57) ABSTRACT

Corner structure of a hollow chamber seal includes a filler piece which is situated in a corner area of the hollow chamber seal. Filler piece supports the hollow chamber seal, with deformation, and diverts supporting forces into a component on which the hollow chamber seal is situated. Corner structure reliably prevents deformation of the hollow chamber seal, even after extended use, is easy to manufacture, and is aesthetic. Filler piece has a base which is adjoined by a T-shaped head made of an elastomeric material, and the head of the filler piece when installed protrudes into the hollow chamber seal through a slit which is introduced into the hollow chamber seal, and is supported on a wall of the hollow chamber seal oppositely situated from the component, with deformation. Base is supported on the component and diverts the supporting forces on the head into the component.

7 Claims, 2 Drawing Sheets

(56) References Cited

U.S. PATENT DOCUMENTS

| | | | | |
|---|---|---|---|---|
| 5,222,336 | A * | 6/1993 | Yada | B62D 25/04 |
| | | | | 296/93 |
| 5,618,079 | A * | 4/1997 | Yukihiko | B29C 47/0023 |
| | | | | 296/93 |
| 6,086,695 | A * | 7/2000 | Kreye | B60J 10/00 |
| | | | | 156/108 |
| 6,393,766 | B2 * | 5/2002 | Nozaki | 49/475.1 |
| 6,520,571 | B2 | 2/2003 | Stemmer et al. | |
| 6,658,802 | B2 * | 12/2003 | Lucas, Jr. | E06B 7/16 |
| | | | | 52/204.597 |
| 8,322,091 | B2 * | 12/2012 | Smith | B60J 1/007 |
| | | | | 49/501 |
| 2001/0034977 | A1 * | 11/2001 | Hattori | B60J 10/24 |
| | | | | 49/479.1 |
| 2002/0003358 | A1 | 1/2002 | Stemmer et al. | |

* cited by examiner

CORNER STRUCTURE OF A HOLLOW CHAMBER SEAL

CROSS-REFERENCE TO RELATED APPLICATION

This application claims priority of German application no. 10 2014 111 215.6, filed Aug. 6, 2014, which is incorporated herein by reference.

FIELD OF THE INVENTION

The invention relates to a corner structure of a hollow chamber seal. More particularly, the invention relates to a corner structure of a hollow chamber seal in which in a corner area of the hollow chamber seal a filler piece is situated which supports the hollow chamber seal, with deformation, and diverts the supporting forces into a component on which the hollow chamber seal is situated.

BACKGROUND OF THE INVENTION

The corner area of a hollow chamber seal is a problem zone, since during installation the hollow chamber seal deforms in this area, with a change in its cross section. This has functional and esthetic drawbacks which, however, may be avoided by use of appropriate measures.

DE 10 2004 020 799 A1 describes a hollow profile seal, preferably for the inlet opening of an oven or stove, which is attached along the circumference at the edge of the inlet opening, wherein reinforcing elements are mounted in the hollow profile in the corner or curved sections, and the joint formed by the end sections of the hollow profile seal circumferentially surrounding the loading opening is selected in such a way that a reinforcing element spans the joint and connects the adjacent end sections.

An elastic hollow profile is known from DE 100 46 975 A1, having at least one hollow chamber and at least one corner curvature for lying flush along a corner area of a vehicle cutout section for a movable locking part, wherein the hollow chamber is used for accommodating a sensor apparatus, and the object to be achieved is to allow functioning of the sensor apparatus in the area of corner curvatures having the smallest possible radius of curvature. For this purpose, the hollow profile is cut out in the corner area up to the hollow chamber, and the cut-out section is filled by a separately manufactured corner unit which is adapted to the angle of curvature of the corner area. As a result, stresses caused by the curvature of the elastic hollow profile are reduced, and the cross section of the hollow chamber remains the same relative to the linear areas, even in the area of the corner curvature.

A corner structure of the generic type is known from DE 299 23 157 U1. This involves a hollow chamber seal which is mounted on a vehicle sliding roof. The sliding roof in the closed state must be sealed off with respect to the vehicle roof. For this purpose, a multipart hollow chamber seal is affixed to the border of the sliding roof. This hollow chamber seal is made up of a sealing part which extends around a corner in a curve, and a further sealing part which adjoins the same via a butt seam. A connecting tube which passes through the butt seam is inserted into these two sealing parts, and extends over the entire curvature of the sealing part which runs around the corner. This connecting tube, as a filler piece, absorbs the deformation forces which act in the corner area of the hollow chamber seal during installation, and diverts them into the sliding roof. As a result, the original cross section of the hollow chamber seal is essentially maintained in the corner area, thus avoiding wind noise and also ensuring a reliable sealing function in this area.

A disadvantage of this approach known from the prior art is that the above-mentioned advantages often are no longer present after extended use, since the connecting tube migrates in the hollow chamber seal, thus eliminating its supportive effect. In addition, introducing the connecting tube into the hollow chamber seal is very complicated. A further disadvantage is that an aesthetically undesirable butt seam is visible at the connecting point between the two sealing parts.

OBJECTS AND SUMMARY OF THE INVENTION

An object of the invention is to provide a corner structure which overcomes the drawbacks of the prior art, reliably prevents deformation of a hollow chamber seal, even after extended use, is easy to manufacture, and also satisfies aesthetic concerns.

This object, and others, is achieved according to the invention with a corner structure having the features as set forth herein.

The corner structure according to the invention further includes a corner structure of a hollow chamber seal including a filler piece situated in a corner area of the hollow chamber seal, and which supports the hollow chamber seal, with deformation, and diverts supporting forces into a component on which the hollow chamber seal is situated. The filler piece has a base which is adjoined by a T-shaped head made of an elastomeric material, and the T-shaped head of the filler piece in an installed state protrudes into the hollow chamber seal through a slit which is introduced into the hollow chamber seal, and is supported on a wall of the hollow chamber seal oppositely situated from the component, with deformation. And, the base of the filler piece is supported on the component and diverts the supporting forces on the head into the component.

Installation of a corner structure according to the invention is very simple. For this purpose, in a hollow chamber seal which is cut to length for the specific application, slits are introduced into the hollow chamber seal in the areas where the corners are formed after installation, and the heads of the filler pieces are inserted into the hollow chamber seal through the slits. It is then only necessary, at the installation site, to lay the hollow chamber seal sections, preassembled in this way, around the component to be sealed, the filler pieces being situated in the corner areas. During installation of the hollow chamber seal, the heads of the filler pieces deform and at the same time support the wall of the hollow chamber seal, the supporting forces being diverted into the component via the base of the filler pieces. It is understood that the ratio of the hardness of the elastomeric material of the heads to the hardness of the elastomeric material of the hollow chamber seal is adapted in such a way that the heads deform sufficiently, but still exert a supporting force on the hollow chamber seal, so that the hollow chamber seal essentially maintains its cross section in the corner area.

In addition to ease of installation, the approach according to the invention is economical, since the necessary tools are inexpensive. The filler pieces may be cost-effectively manufactured as injection-molded parts. Due to the supporting effect of the filler pieces in the corner area, the sealing function of the hollow chamber seal is fully maintained at that location. In addition, the seal also provides a mechanical hold transverse to the installation plane of the hollow chamber seal. The approach according to the invention also satisfies aesthetic requirements, as it provides a uniform, consistent appearance.

Further advantageous embodiments of the invention result from the additional embodiments set forth herein.

Relative terms such as up, down, left, and right are for convenience only and are not intended to be limiting.

The invention is explained in greater detail below with reference to embodiments. The associated drawings show the following:

DETAILED DESCRIPTION OF THE INVENTION

Figure 1:
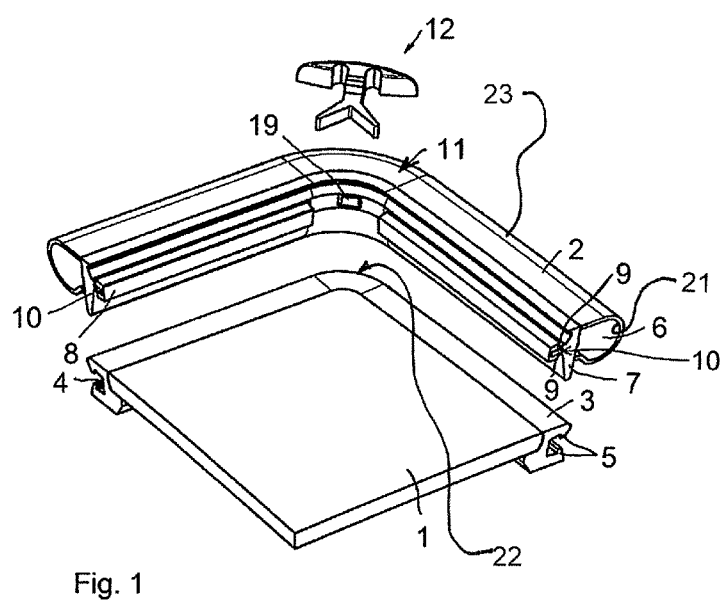
FIG. 1 shows a perspective view of a component, a hollow chamber seal to be attached thereto, and a filler piece, prior to installation.

FIG. 1 shows a panel 1, which may be an automobile sliding roof, for example. A hollow chamber seal 2 which is intended to seal off the panel 1 from another component, for example an automobile roof, is to be mounted at the border area of the panel 1. The panel 1 is extrusion-coated with a plastic frame 3 which is provided with a circumferential receiving groove 4. The receiving groove 4 has two oppositely situated undercuts 5 in its entry area.

The hollow chamber seal 2 is made of an elastomer, for example rubber. The hollow chamber seal has a continuous cavity 6 over its entire length. Protruding downwardly from the inner side of the cavity 6 on the installation side is a sealing lip 7, which on its inner side is provided with a perpendicularly protruding insert strip 8. At its transition to the sealing lip 7, the insert strip 8 has two oppositely situated undercuts 9 which have a complementary configuration with respect to the undercuts 5 of the receiving groove 4. In addition, the insert strip 8 is provided with a continuous cavity 10 which extends over its entire length.

For installing the hollow chamber seal 2 on the panel 1, the insert strip 8 is inserted into the receiving groove 4 of the panel 1. In the process, the undercuts 5 of the plastic frame 3 and the undercuts 9 of the insert strip 8 cooperate in such a way that the hollow chamber seal 2 may be easily inserted into the receiving groove 4, and in this position is fixedly held on the panel 1. During the insertion of the insert strip 8 into the receiving groove 4, the cavity 10 causes temporary compression of the insert strip 8, which facilitates insertion of the insert strip 8 into the receiving groove 4.

Without further precautionary measures, the cross section of the hollow chamber seal 2 would vary greatly in the corner area 11, thus impairing or even eliminating the sealing function in this area.

Figures 2, 3:
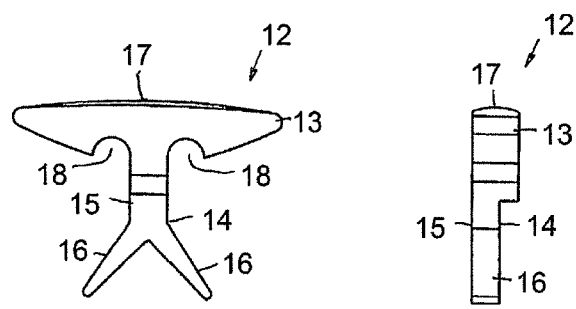
FIG. 2 shows a front view of the filler piece according to FIG. 1 on enlarged scale.
FIG. 3 shows a side view of the filler piece.

To avoid these disadvantages, a filler piece 12 is provided in the corner area 11 of the hollow chamber seal 2 having a wall 23. The filler piece 12 is manufactured as an injection-molded part having a head 13 and a base 14. The head 13 is made of an elastomeric material, while the base 14 is made of a rigid plastic material. At its free end the base 14 has two legs 16 which define a right angle. The legs 16 are adjoined by a shank 15 which merges into the T-shaped head 13, which has a shoulder 17 on its top side for resting against an inner wall 21 of the hollow chamber seal 2. At the transition portion of the shank 15 to the head 13, relief cuts 18 are provided which are used to allow unrestrained deformation of the head 13 during installation. The base 14 of the filler piece 12 is not as wide as the head 13, which is most readily apparent from FIG. 3. This difference in width is necessary on the one hand to provide a sufficiently wide shoulder 17, and on the other hand, to ensure that the base 14 can be inserted into the receiving groove 4 of the frame 3 during installation.

The insert strip 8 is cut away in this area to allow installation of the filler piece 12. In addition, a slit 19 is introduced at the inner side of the hollow chamber seal 2 to provide access into the cavity 6 of the hollow chamber seal 2.

Figure 4:
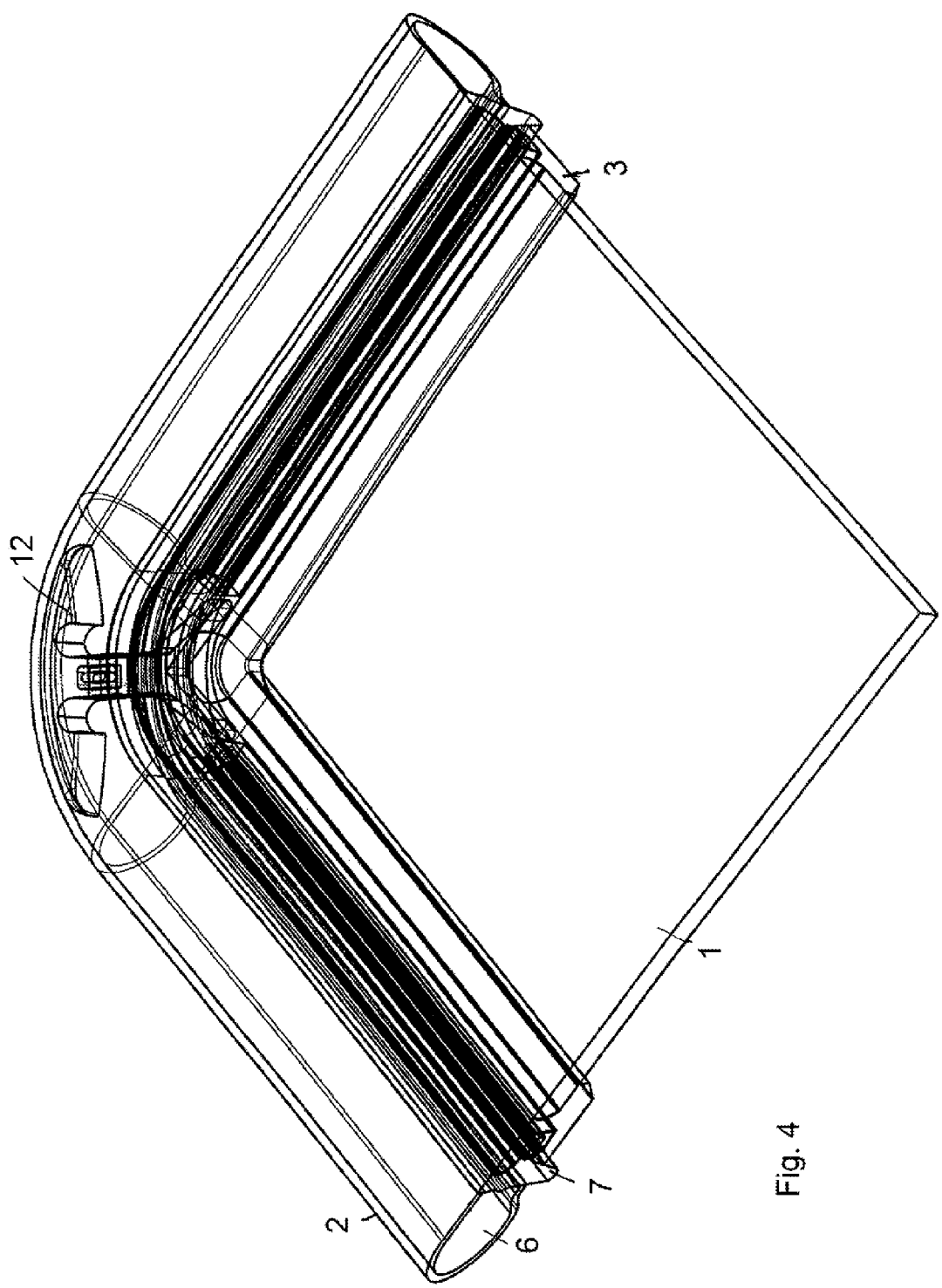
FIG. 4 shows an illustration according to FIG. 1 with the hollow chamber seal installed, the hollow chamber seal being transparent in the illustration.

Prior to installation of the hollow chamber seal 2 on the panel 1, the filler piece 12 is passed through the slit 19, so that the head 13 is situated in the cavity 6, while the base 14 on the inner side protrudes from the hollow chamber seal 2. In the installed state, the shoulder 17 of the head 13, with corresponding deformation of the head 13, rests on the inner wall 21 of the hollow chamber seal 2 and supports it. The supporting force is diverted to the frame 3 via the base 14, with the legs 16 of the base 14 resting against a corner 22 of the frame 3 on both sides. The installed state of the filler piece 12 is illustrated in FIG. 4.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A corner structure of a hollow chamber seal, comprising:
    a) a filler piece, and the filler piece is situated in a corner area of the hollow chamber seal, and the filler piece supports the hollow chamber seal under deformation of the filler piece, and the filler piece diverts supporting forces transferred to the filler piece, as a result of supporting the hollow chamber seal, to a component on which the hollow chamber seal is situated;
    b) the filler piece has a base which is adjoined with a T-shaped head made of an elastomeric material, and the T-shaped head of the filler piece in an installed state protrudes into the hollow chamber seal through a slit in the hollow chamber seal, and is supported on a wall of the hollow chamber seal oppositely situated from the component, under deformation;
    c) the base of the filler piece is supported on the component and diverts the supporting forces on the head onto the component, and
    d) wherein two legs are provided on the base of the filler piece for resting against both sides of a corner of the component.

2. The corner structure according to claim 1, wherein: the base merges into the head via a shank, and relief cuts are provided at a transition portion of the shank to the head.

3. The corner structure according to claim 1, wherein: the filler piece is manufactured as an injection-molded part.

4. The corner structure according to claim 1, wherein:
the base merges into the head via a shank, and relief cuts are provided at a transition portion of the shank to the head.

5. The corner structure according to claim 4, wherein:
the filler piece is manufactured as an injection-molded part.

6. A corner structure of a hollow chamber seal, comprising:
a) a filler piece having a base, and the filler piece is situated in a corner area of the hollow chamber seal, and the filler piece supports the hollow chamber seal under deformation of the filler piece, and the filler piece diverts supporting forces transferred to the filler piece, as a result of supporting the hollow chamber seal, to a component on which the hollow chamber seal is situated;
b) a T-shaped head is provided on the filler piece, and the T-shaped head of the filler piece in an installed state protrudes into the hollow chamber seal through a slit located in the hollow chamber seal, and the T-shaped head of the filler piece is supported on a wall of the hollow chamber seal, situated oppositely to the component, under deformation of the T-shaped head such that the hollow chamber seal substantially maintains its cross section;
c) wherein the base of the filler piece is supported on the component, and the base diverts the supporting forces transferred to the T-shaped head, as a result of supporting the hollow chamber seal, to the component, and
d) wherein two legs are provided on the base of the filler piece for resting against both sides of a corner of the component.

7. The corner structure according to claim 6, wherein: the base merges into the head via a shank, and relief cuts are provided at a transition portion of the shank to the head.

* * * * *